(12) United States Patent
Yemul et al.

(10) Patent No.: US 9,012,101 B2
(45) Date of Patent: Apr. 21, 2015

(54) FUEL CELL STACKS

(71) Applicant: ReliOn, Inc, Spokane, WA (US)

(72) Inventors: Dinesh S. Yemul, Spokane Valley, WA (US); Scott A. Spink, Spokane, WA (US); David R Lott, Spokane, WA (US); Lijun Bai, Spokane, WA (US)

(73) Assignee: ReliOn, Inc., Spokane, WA (US)

( * ) Notice: Subject to any disclaimer, the term of this patent is extended or adjusted under 35 U.S.C. 154(b) by 141 days.

(21) Appl. No.: 13/909,953

(22) Filed: Jun. 4, 2013

(65) Prior Publication Data

US 2013/0337353 A1  Dec. 19, 2013

Related U.S. Application Data

(60) Provisional application No. 61/656,925, filed on Jun. 7, 2012.

(51) Int. Cl.
*H01M 8/04* (2006.01)

(52) U.S. Cl.
CPC ........ *H01M 8/04298* (2013.01); *H01M 8/0488* (2013.01); *H01M 8/04701* (2013.01); *H01M 8/04753* (2013.01); *Y02E 60/50* (2013.01); *H01M 8/04992* (2013.01)

(58) Field of Classification Search
CPC ............... H01M 8/04753; H01M 8/04992; H01M 8/04701; H01M 8/04298; H01M 8/0488
USPC .......................................... 429/428
See application file for complete search history.

*Primary Examiner* — Helen O Conley
(74) *Attorney, Agent, or Firm* — Paul W. Mitchell; Rainier Patents, P.S.

(57) ABSTRACT

The patent relates to fuel cell systems and controlling fuel cell systems. One fuel cell system includes at least one fuel cell stack that includes multiple different serially arranged cells. The system also includes at least one component configured to effect an operating environment of the at least one fuel cell stack. The system further includes a controller configured to operate the at least one component at a primary control point relating to one or more parameters of the operating environment. The controller is further configured to temporarily adjust the at least one component to a secondary control point relating to the one or more parameters. The controller can then re-adjust the at least one component to the primary control point. The fuel cell system can achieve greater overall performance than can be obtained without the adjusting and re-adjusting.

21 Claims, 5 Drawing Sheets

FUEL CELL STACKS

PRIORITY

This utility application claims priority from U.S. Provisional Application 61/656,925 filed on Jun. 7, 2012, which is incorporated by reference in its entirety.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent relates to fuel cell stacks and fuel cell systems that include fuel cell stacks. A fuel cell stack can be thought of as a set of serially electrically coupled cells compressed together. A fuel cell system can be thought of as one or more fuel cell stacks and accompanying components that facilitate the function of the fuel cell stacks. The fuel cell systems can employ one or more control points related to fuel cell stack performance. The control points can relate to one or more operating parameters of the fuel cell system. The present concepts can enhance overall fuel cell system performance by perturbing individual control points rather than trying to maintain a given control point over an extended period. Control point perturbation concepts can be applied to any control point that relates to the operating environment of the fuel cell stack and/or individual fuel cells. Briefly, control points can include: fuel cell operating temperature, fuel cell hydration, fuel cell voltage, and/or fuel cell stoichiometry, among others. Examples of such control points are described in more detail below.

Example Implementations

Figure 1:
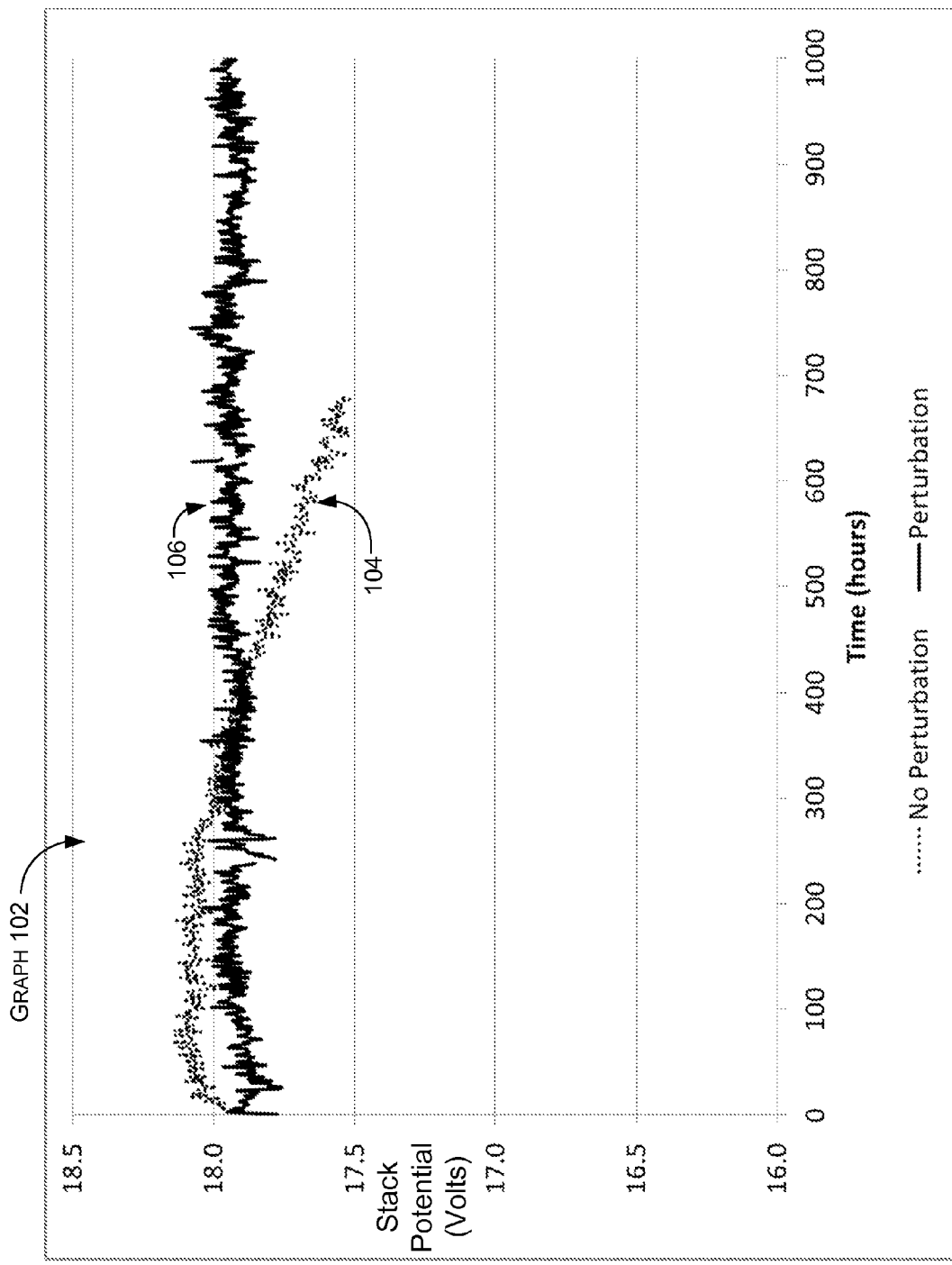
FIGS. 1-3 show graph examples related to fuel cell control point perturbation examples that can be generated in accordance with some implementations of the present concepts.

The present control point perturbation concepts can be implemented in various ways across various fuel cell systems. For example, FIG. 1 shows a graph 102 that tracks performance of a fuel cell system that includes a single fuel cell stack that includes 24 cells. Note that graph 102 is provided for purposes of explanation. Other implementations may produce different results than those illustrated here.

Graph 102 relates time (in hours) on the horizontal axis to stack potential (in volts) on the vertical axis. The stack potential is measured across the series connection of the 24 cells, and the end terminals of the series, and gives a measure of the stability of voltage across the fuel cell stack. Graph 102 shows fuel cell system performance without forced temperature perturbations at 104 and fuel cell system performance with the forced temperature perturbations at 106. In both cases, the fuel cell is under the same external load. There is a significant difference in the stability of the voltage with and without the forced temperature perturbations. The improvement in the fuel cell performance can be characterized in a variety of ways: the fuel cell voltage over time is higher (an improvement in efficiency) for a longer period of time (improved stability) which ultimately results in an improvement in overall fuel cell system performance over time (durability).

In contrast to these findings, conventional wisdom would suggest that there is a best or optimal set of conditions for operating a fuel cell stack that, when found, results in an optimal output and durability for the fuel cell system. It is common practice to match a variety of system properties (reactant humidity, temperature, etc.) to some control point (current, voltage, temperature, etc.) in order to achieve the optimal output and stability of the fuel cell system over the life of the fuel cell stack. As used herein the term "property" can be thought of as a physical capability, quantity, or feature of a physical item (e.g., specific voltage, specific temperature, defined constant at one operating point, etc.).

Figure 2:
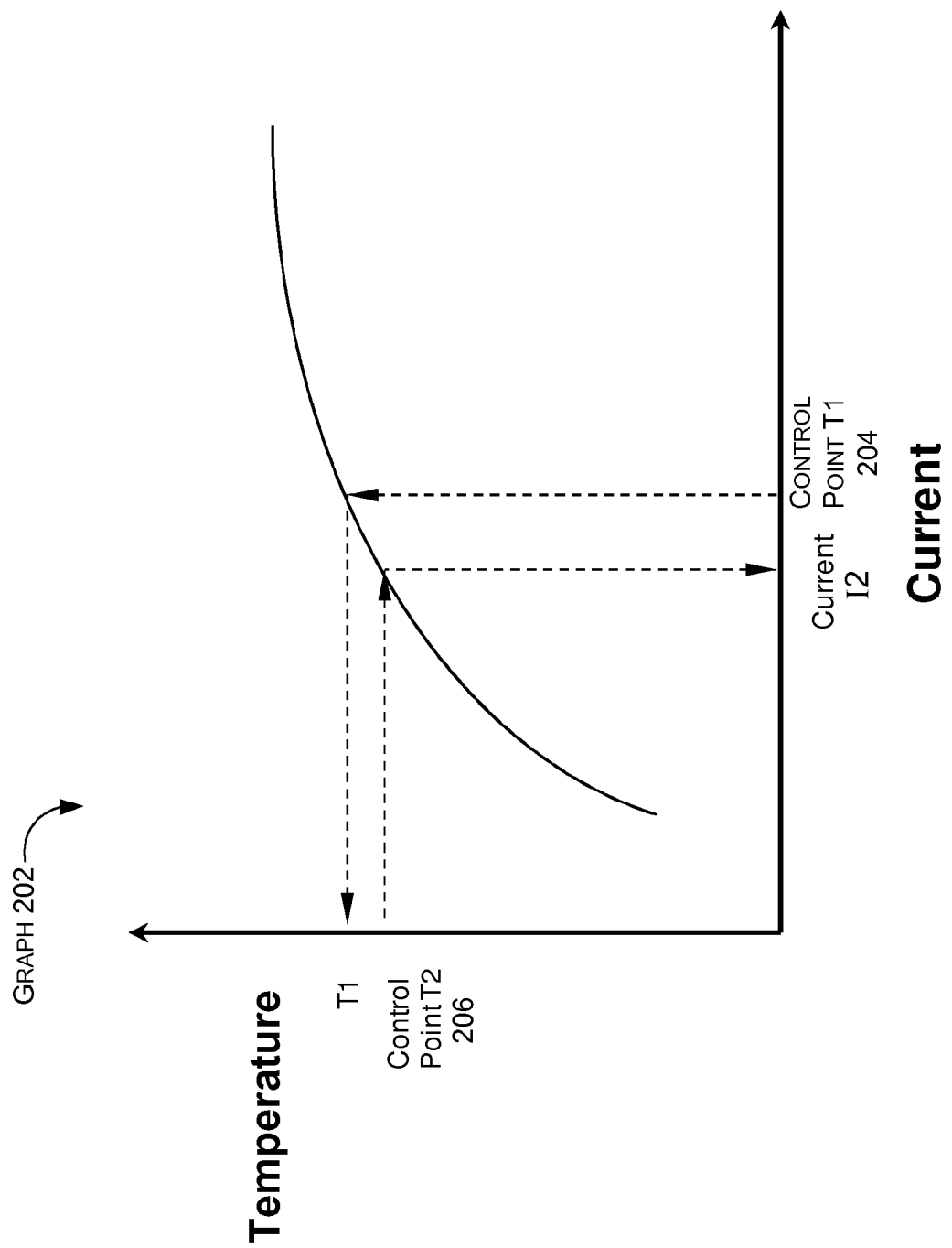

FIG. 2 shows an example graph 202 that illustrates the relationship between the fuel cell temperature (vertical axis) and the fuel cell current (horizontal axis). Graph 202 shows that a first control point for the current can produce a temperature value T1 (indicated at 204) and a control point T2 (indicated at 206) at a specific temperature can produce a current I2. Note that graph 202 is provided for purposes of explanation. Other implementations may produce different results than those illustrated here.

In attempting to find the best set of operating conditions for individual fuel cell systems, it was discovered that there really may not be a sustainable optimal set of conditions. Repeated attempts to run a long term test produced accelerated decay rates for the cell voltages or fuel cell system power at a given control point. Experimentation showed that any increase in performance for a potential optimum setting produced a temporary increase in performance but it would fade over time. It was then discovered that perturbing the system periodically (or from time-to-time) tends to offer better overall performance. This concept was applied specifically to the fuel cell temperature set point of fuel cell systems offering 200 W through 2500 W outputs, in one implementation. Of course, the present concepts are applicable to fuel cell systems that have other power outputs.

Figure 3:
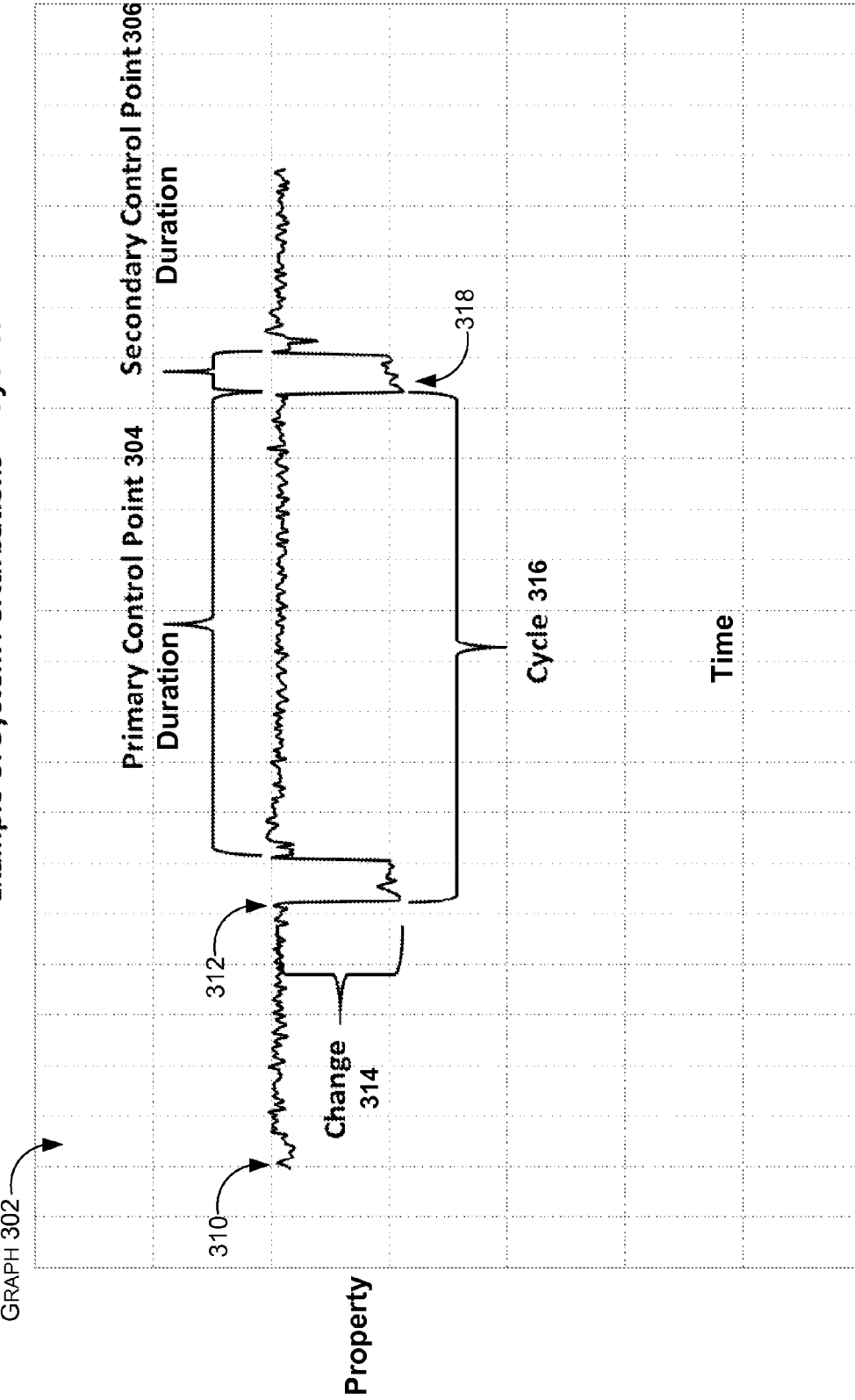

FIG. 3 shows one possible example of system perturbations represented on a graph 302. Note that graph 302 is provided for purposes of explanation. Other implementations may produce different results than those illustrated here.

The graph 302 relates time on the horizontal axis to a fuel cell system property on the vertical axis. Thus, the value of the property is tracked over time. Graph 302 includes several durations when the fuel cell stack environment is operating at a primary control point 304 and a secondary control point 306. Starting at the left side 310 of the graph, the property is maintained at the primary control point (only partially shown) until the operation is temporarily changed to the secondary control point at 312. This change in the property value between the primary and secondary control points is indicated at 314. In this implementation, the change between the primary and secondary control points is very sharp. However, in other implementations, the change could be more gradual. For instance, the fuel cell operating environment could be operated at the primary control value and then gradually changed to the secondary control value and then gradually changed back to the primary control value. A portion of the graph that includes a duration of operation at the primary control point 304 and a duration at the secondary control point 306 can be thought of as a cycle 316. (Note that the labeled cycle 316 covers a secondary control point duration and then a first control point duration, but could of course, start with the primary control point duration and finish at the conclusion of the secondary point duration). The cycle 308 is repeated starting at 318.

To summarize, the present concepts can purposely operate fuel cells systems to avoid a steady-state set of conditions. Traditional control attempted to reach a set of conditions that were thought to be efficient and potentially optimum for the performance characteristics of the fuel cell systems. In contrast, the present concepts can make periodic (or continual) changes in the operating characteristics of the fuel cell, forcing the fuel cells out of their normal control point and then allowing them to return. Results verify that the overall performance and stability of the fuel cell system is improved significantly and that the new level of performance was not sustainable without the forced perturbations in the fuel cell system. Stated another way, perturbing control points of the fuel cell system (which typically results in a short term loss of performance) is implemented in order to improve the overall performance.

Recall that the present control point perturbation concepts can be applied to any control point that relates to the operating environment of the fuel cell stack and/or individual fuel cells. The control point perturbation concepts can be employed regardless of output requirements of the fuel cell systems or the normal changes based on environmental conditions. In fact, during most of the forced transients the output power of the system drops for minutes (something that conventional wisdom would suggest is not a desirable outcome). But the overall effect is an increase in output power and fuel cell voltage stability (efficiency) which offsets the short-term loss of output. Three example control points relating to the stoichiometry, temperature, and fuel cell voltage are discussed in more detail below.

Perturbation concepts can be applied to any control point that relates to the operating environment of the fuel cell stack and/or individual fuel cells. Briefly, control points can include: fuel cell operating temperature, fuel cell hydration, voltage, and/or stoichiometry, among others. Examples of such control points are described below.

Temperature Perturbation

Some implementations of the control point perturbation concepts can change the temperature control point of the fuel cell modules for a specified amount of time on a periodic basis. This can cause a partial flooding of the fuel cells and a corresponding drop in output power during the temperature suppression. When the fuel cell system is running with a suppressed calculated temperature control point, the output power is decreased and tends to remain so until shortly after the temperature is returned to original control. The net effect of this is to improve the long term stability of the fuel cell system.

Temperature perturbations can be implemented in a number of ways, depending on the various concerns. It is likely that each type of fuel cell system could have its own, unique "desired" set of parameters. As used herein, the term "desired" can mean relatively high performing and potentially the best performing parameters. As used herein, the term "parameter" can be thought of as a variable number describing an input action which has an effect on the system performance (e.g., temperature parameter, fan speed parameter, voltage parameter, etc.). Some specific examples of how this concept could be implemented are included below (the list is not exhaustive, but rather a representative set of examples). Other examples should be apparent to one skilled in the art depending on the specific control points for any given fuel cell system. The specific method by which the temperature change is made may depend on the system specifics (air-cooled, liquid-cooled, etc.).

In a basic example, the fuel cell system controls the change, duration, and interval properties of the temperature perturbations. Each of these properties is established and runs consistently throughout the operation of the fuel cell system. In the example graph 302 of FIG. 3 the change is shown as a reduction in the property to a secondary control point 306; however, it is possible that the best benefit would be reached by an increase in the property, again, depending on the specific control point of the system.

The fuel cell system could also be implemented such that one or more of the properties are dynamically adjusted based on other system properties. For example, the depth or extent of the perturbation could be adjusted based on a temperature to prevent the fuel cells from suffering potentially damaging flooding.

Alternately, the temperature perturbation could be configured with a delay from the start of the fuel cell system's operation, such that the temperature perturbation only was initiated after a fixed period of time (presumably when the natural decay would start to manifest as a loss of power) or in response to some set of conditions (a particular temperature is reached or exceeded, etc.).

Reactant Stoichiometry

Fuel cell systems need the correct amount of reactants (e.g., stoichiometry) in order to produce stable output power. If the supply of one or more reactants is changed, a change in the output of the fuel cell may occur. This is often discussed as a consequence of insufficient hydrogen, where a reduction in the supply of hydrogen causes damage to cells.

If the amount of air (as a specific example) is decreased, regardless of the temperature set point or needs of the fuel cell, the fuel cell system could have a short-term performance loss. However, the overall stability of the fuel cell voltage may become more stable over a long period of time (depending of the specific operating conditions of the fuel cell).

As with the temperature perturbations, there are a number of ways that the cathode stoichiometry change can be implemented based on fuel cell system specifics.

The fuel cell system's reactant air rate can be increased (via pump, fan, or other methods) using similar parameters (e.g., duration and cycle time) discussed under the temperature perturbation, with the magnitude of the change having either a positive or negative value.

The specific changes could be kept static during the entire run or changed in response to some particular fuel cell system property. For example, cathode stoichiometry changes would tend to only be made above a certain fuel cell current density. In another instance, the stoichiometry changes would not be made if the stack temperatures are outside a desired range.

The perturbations are discussed as cathode stoichiometry changes because those may provide the (potentially) greatest benefit for a dead-ended and air-cooled system. Based on these results it is entirely possible that a particular system which has a measured anode (hydrogen) stoichiometry could benefit from changes in the fuel flow rate.

Voltage Perturbation

A number of factors contribute to the overall voltage of the fuel cell stack while operating in a system. Often, the voltage of the fuel cell is ideally operated at the highest possible value for the current being produced, thereby maximizing the efficiency of the system. The fuel cell system can periodically modify the output and allow the voltage of the fuel cell stack to deviate from its normally desired value to a non-optimal point. Once again, the fuel cell is operated at a non-optimal point in order to ultimately improve the efficiency of the system. The specific parameters of the voltage perturbation can be adjusted as needed.

The magnitude and direction of the voltage change could be varied depending on the operating conditions of the fuel cell. In a flooded state the voltage could be increased (lowering the current and thus reducing water production) and when the fuel cell system is in a dehydrated state the voltage could be lowered (increasing the current and water production). The options for changing the duration and cycle time of the voltage pulse in response to other system parameters are applicable to these perturbations as well.

When making voltage changes, the corresponding change in current could affect the fuel cell system stoichiometry and the system's target temperature. Those changes could be suspended or realized depending on what provides the best benefit for the performance.

Voltage changes could also have additional benefits for removing impurities or changing the activity of the catalyst depending on the final voltage and duration. It is possible that, should the system design allow it, a multiple step voltage change could be made to capture several different benefits. The voltage perturbation could start at a low voltage then operate at a high voltage and then return to the normal target voltage. The success of such action would once again depend on the system specifics.

Transient Cycling Implementation

As with all of the perturbations discussed, the desired or best implementation on a system level will depend on the system being operated. The (potentially) ideal parameter or combination of parameters used can ultimately be determined by the system and the goals for power and stability.

Some of the examples above showed a single secondary or alternative control point for a property. The number of alternative control points could vary depending on the specific parameters of the fuel cell system. For example, the first alternative control point could reduce the value of the property and the second alternative control point could have an increase in the value of the property.

Some of the examples above showed a step pattern in the control property. The transients do not need to follow such a pattern and any cyclic pattern (sinusoidal, saw-tooth, etc.) could be used if it achieved the desired results (e.g., enhancing overall performance relative to maintaining a single control point). The specific cyclic pattern need not be identical for each of the parameters used.

A variety of thresholds could be used to enable or disable the forced transient conditions within the fuel cell. Such thresholds could include, but are not limited to, the loss of a certain percentage of power (for example 5%), operation of the system longer than a specified period of time (for example continuous operation for more than 1 hour), and/or operation in an environment outside a predetermined temperature range (for example when the ambient conditions are below 0° C.).

Each aspect of the control point perturbations has been discussed independently above, but they may be implemented in a system in combination with each other.

Example Operating Environment

Figure 4:
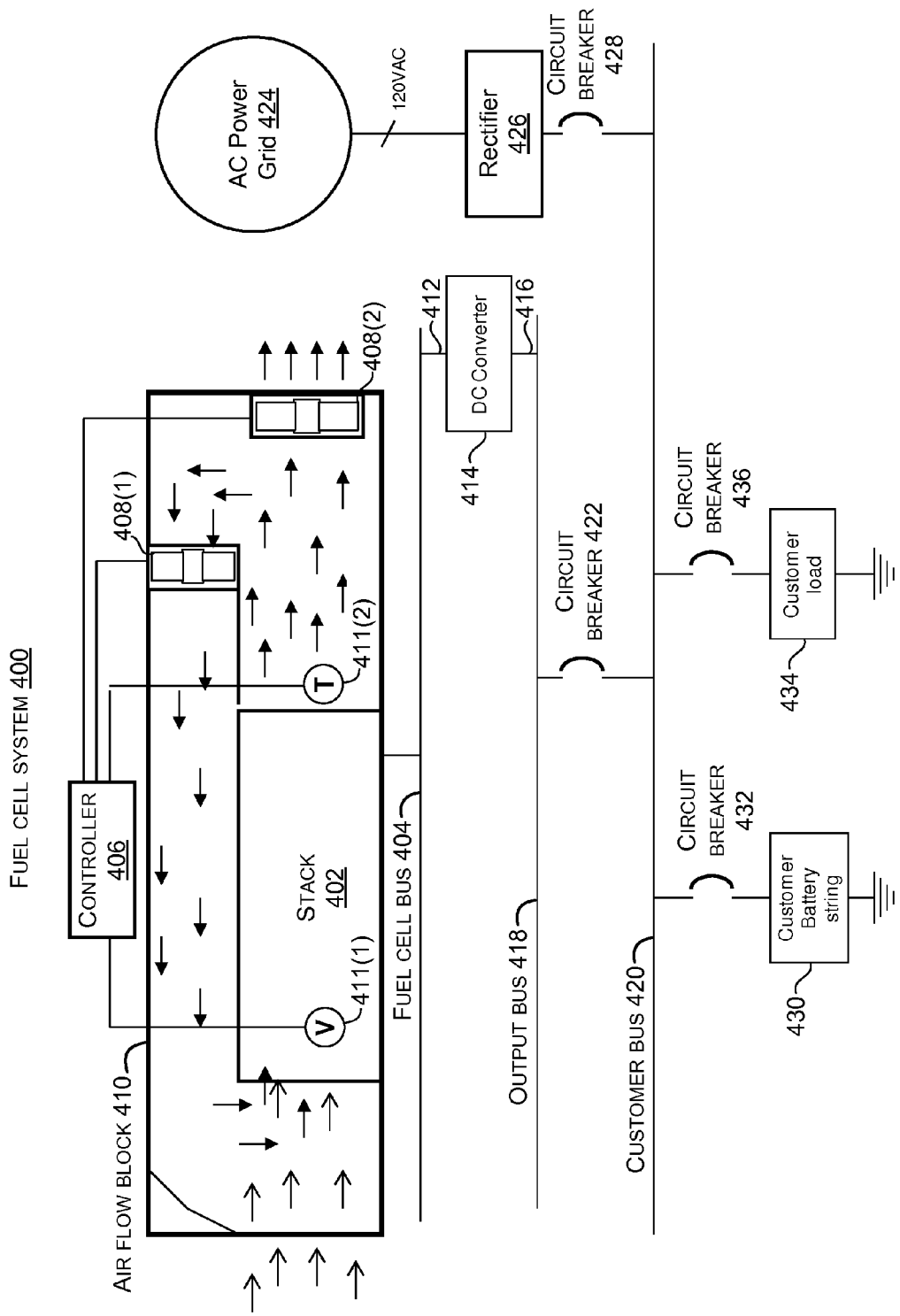
FIG. 4 shows an example fuel cell stack system that is configured to employ control point perturbation concepts in accordance with some implementations.

FIG. 4 shows an example fuel cell system 400 in which one or more fuel cell stacks 402 can be employed. Fuel cell stack 402 can include multiple different serially arranged cells. While only a single fuel cell stack 402 is illustrated, other implementations can include multiple fuel cell stacks. The fuel cell stack 402 is connected to a fuel cell bus 404. The fuel cell stack 402 is also coupled to a controller 406. The controller 406 can contain a microprocessor or other processing device that is configured or configurable to control functionality related to the operating environment of the fuel cell stack 402. For instance, the controller can control operation of fans 408(1) and/or 408(2) and/or a fuel supply (not shown). The fans are capable of moving air relative to an airflow block 410 proximate to the fuel cell stack 402. For example, the controller can set the temperature property (known steady state operating temperature) on the fuel cell stack by adjusting the parameter of fan speed through a pulse width modulated signal to the fan. The controller 406 can also be connected to various sensors. The sensors can provide information about conditions relating to the fuel cell system 400. In the illustrated configuration, the controller is connected to a voltage sensor 411(1) and a temperature sensor 411(2).

The fuel cell bus 404 is connected to an input side 412 of a DC power converter or "DC converter" 414. An output side 416 of the DC converter 414 is connected to an output bus 418. The output bus 418 is switchably connected to a customer bus 420 via a circuit breaker 422. The AC power grid 424 is connected to a rectifier 426 that is then switchably connected to the customer bus 420 via another circuit breaker 428. A customer battery string 430 is switchably connected to the customer bus 420 via another circuit breaker 432. Finally, a customer load 434 is switchably connected to the customer bus 420 via another circuit breaker 436.

In this case, the customer battery string 430 includes four 12 volt batteries connected in series. The DC power received from the rectifier 426 is at or slightly above 48 volts. If power is lost on the AC power grid 424, the customer battery string 430 and/or the fuel cell stack 402 can supply power for the customer load 434. Thus, the DC converter 414 can supply 48 volts (or slightly higher) from the fuel cell stack 402 to the output bus 418. Of course, fuel cell system 400 is only one possible example of a fuel cell system upon which the present concepts can be implemented. Other fuel cell systems can have additional, fewer, and/or different components than the illustrated configuration.

The controller 406 can control components of the fuel cell system 400 relative to various parameters. Individual parameters can be associated with control points. Controller 406 can employ control point perturbation concepts described above and below. Stated another way, the controller 406 can determine desired properties for different parameters of the system (fuel cell voltage, fuel cell current, reactant stoichiometry, fan speed, and/or fuel cell temperature, among others) based on appropriate inputs to the controller (external load, ambient temperatures, etc.). The controller can adjust one or more of the parameters of the system, causing a change in the fuel cell or fuel cell stack. In one implementation, the controller can perform the adjusting periodically, not in response to the normal inputs to the controller, but possibly in response to other inputs. This change cycle can be completed and then the normal controller process can be reinstated.

To summarize, from one perspective, the system can achieve certain conditions with certain parameters at a "normal" operating point (first set of parameters defining a known operating property). Once these certain conditions are met, the system can be configured to perturb one or more of those parameters (e.g., second set) to create a "perturbed" operating point (or new known property) for a period of time. The period of time can be defined by the system. Once the period of time expires, the system can return to the original or normal conditions with the original first set of parameters. This configuration can potentially result in decreased performance at particular instances in time, but overall system performance tends to be enhanced when measured in longer periods of time.

In some configurations the controller 406 can include a processing device, such as a microprocessor. In some cases, the controller can be manifest as a decision making device. Examples of decision making devices can include a series of logic devices, a field-programmable gate array (FGPA), or a microprocessor, among others.

Example Method

Figure 5:
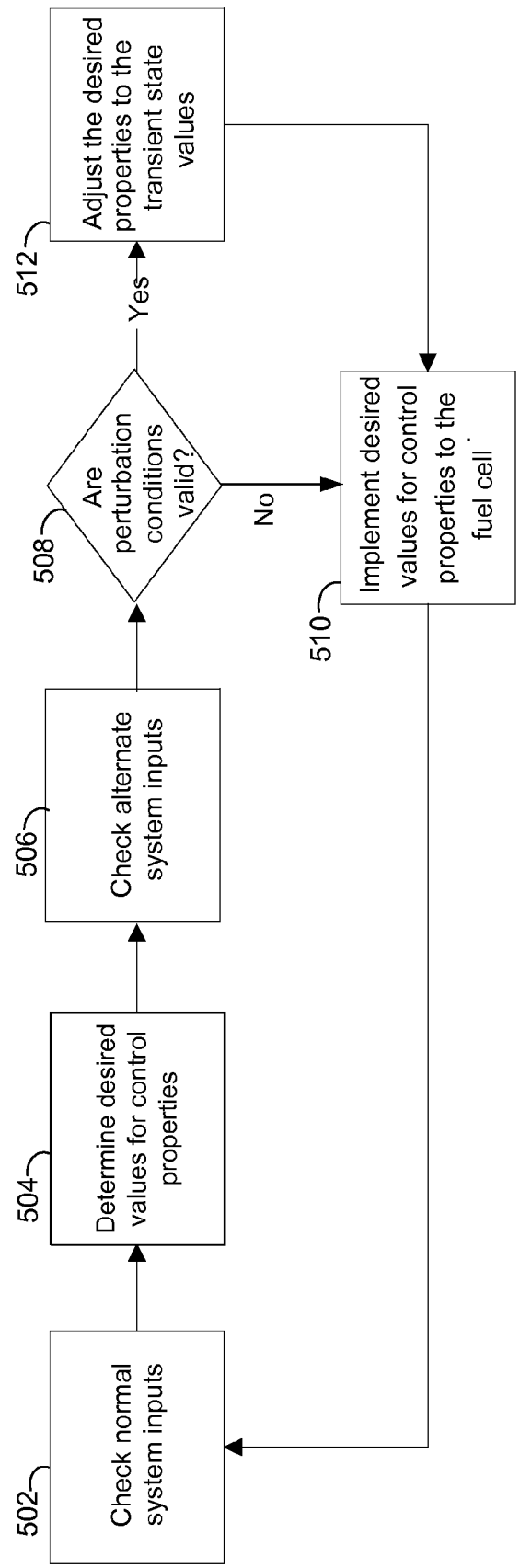
FIG. 5 shows a flowchart of a method example for accomplishing the present control point perturbation concepts in accordance with some implementations.

FIG. 5 is a flow chart of a technique or method 500 for implementing control point perturbation.

The method can check normal system inputs at 502. In this case, 'normal' can be thought of as a set of parameters, such as current and/or temperature, that are set at one point. As described below, individual parameters can be perturbed to a new set point in some scenarios.

The method can determine desired values for control properties at 504. From one perspective a desired value can be thought of as a selected or target value.

The method can check alternate system inputs at 506.

At 508, the method can query whether perturbation conditions are valid. A "no" response at 508 (e.g., the perturbation conditions are not valid) can cause the method to implement changes in properties to the fuel cell at 510. The method can then be repeated by returning to block 502. A "yes" response at 508 (e.g., the perturbation conditions are valid) can cause the method to adjust the desired properties to the transient state values at 512. The method can then perform block 510 and return to block 502.

Stated another way, the method can check the normal inputs used to control the fuel cell and can determine what values are desired for the properties of the fuel cells. The method can then check the inputs (which may include data from the normal inputs as well as alternate inputs) to determine if the perturbation conditions have been met. If the perturbation conditions have been met, the desired values can be adjusted to the transient state values and then implemented. If the perturbation conditions have not been met, the desired values can be implemented. Regardless, the control loop can cycle back to begin the process again. When the perturbation conditions are not valid the desired values can simply be used.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the methods. In one case, the method is stored on one or more computer-readable storage media/medium as a set of computer-readable instructions such that execution by a computing device (such as by a processing device) causes the computing device to perform the method. In some implementations, a controller, such as controller 406 of FIG. 4, can be manifest as a computing device that performs the method. A computing device can be defined as any device that has some processing and/or media storage capabilities. For instance, a computing device can be manifest as an application-specific integrated circuit (ASIC), a system-on-a-chip, or a personal computer, among others.

CONCLUSION

Although techniques, methods, devices, systems, etc. pertaining to fuel cell stacks are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   operating a fuel cell system at a control point, wherein the control point is defined by a set of operating parameters and wherein an individual operating parameter is set at a value that contributes to the control point,
   cycling the fuel cell out of the control point by:
      temporarily changing at least one of the operating parameters to a different value that causes the fuel cell system to operate at another control point; and,
      returning an individual changed operating parameter to the value of the control point.

2. The method of claim 1, wherein the control point is relatively highly efficient, and wherein the cycling produces a better overall performance than maintaining the control point when measured for a life of the system.

3. The method of claim 1, wherein the cycling is performed on a periodic basis.

4. The method of claim 1, wherein the cycling is performed responsive to detecting a change in performance of the fuel cell system.

5. The method of claim 4, wherein the change comprises a decrease in performance of the fuel cell system or wherein the change comprises an increase in performance of the fuel cell system.

6. The method of claim 1, wherein the parameters of the set of the parameters include a temperature parameter, a fan speed parameter, a current parameter, or a voltage parameter.

7. The method of claim 1, wherein the temporarily changing at least one of the operating parameters comprises temporarily changing multiple of the operating parameters.

8. The method of claim 1, wherein the returning an individual changed operating parameter comprises returning all of the temporarily changed operating parameters.

9. At least one computer-readable storage medium having instructions stored thereon for accomplishing the method of claim 1.

10. The fuel cell system comprising a processing device and at least one computer-readable storage medium having computer-readable instructions stored thereon that when executed by the processing device cause the fuel cell system to perform the method of claim 1.

11. The fuel cell system of claim 10, wherein the processing device comprises a decision making device that is configured to execute the computer-readable instructions.

12. The fuel cell system of claim 11, wherein the decision making device comprises a series of logic devices, a field-programmable gate array (FGPA), or a microprocessor.

13. A fuel cell system, comprising:
    at least one fuel cell stack comprising multiple different serially arranged cells;
    at least one component configured to effect an operating environment of the at least one fuel cell stack; and,
    a controller configured to operate the at least one component at a primary control point relating to one or more parameters of the operating environment and further configured to temporarily adjust the at least one component to a secondary control point relating to the one or more parameters and then to re-adjust the at least one component to the primary control point and wherein the fuel cell system achieves greater overall performance than without the adjusting and re-adjusting.

14. The fuel cell system of claim 13, wherein the at least one fuel cell stack comprises multiple fuel cell stacks.

15. The fuel cell system of claim 13, wherein the at least one component comprises a fan.

16. The fuel cell system of claim 13, wherein the overall performance is based upon a cycle that includes operating at the primary control point, the adjusting away from the primary control point, and the re-adjusting back to the primary control point.

17. The fuel cell system of claim 13, wherein the controller comprises a processing device.

18. The fuel cell system of claim 13, wherein the controller comprises a decision making device that is configured to execute computer-readable instructions.

19. The fuel cell system of claim 18, wherein the decision making device comprises a series of logic devices, a field-programmable gate array (FGPA), or a microprocessor.

20. The fuel cell system of claim 13, further comprising at least one sensor configured to sense an individual parameter of the operating environment and wherein the at least one sensor is communicatively coupled to the controller.

21. A fuel cell system, comprising:

at least one fuel cell stack comprising multiple different serially arranged cells;

at least one component configured to effect an operating environment of the at least one fuel cell stack;

at least one sensor configured to sense the operating environment; and, a controller configured to operate the at least one component at a control point relating to one or more parameters of the operating environment and further configured to temporarily adjust the at least one component away from the control point and then to re-adjust the at least one component toward the control point and wherein the controller is configured to adjust and re-adjust the component periodically or responsive to information from the at least one sensor.

* * * * *